United States Patent [19]

Proise

[11] Patent Number: 5,213,046
[45] Date of Patent: May 25, 1993

[54] MAGNETIC FIELD CONFINEMENT FOR MAGNETICALLY LEVITATED VEHICLES

[75] Inventor: Michael Proise, Garden City, N.Y.

[73] Assignee: Grumman Aerospace Corporation, Bethpage, N.Y.

[21] Appl. No.: 822,614

[22] Filed: Jan. 17, 1992

[51] Int. Cl.⁵ .......................................... B60L 13/04
[52] U.S. Cl. .................................... 104/281; 104/286; 104/282
[58] Field of Search .............. 104/281, 282, 292, 283, 104/286, 284, 290, 293, 294; 191/10; 505/902, 903, 904, 905, 906, 907, 908

[56] References Cited

U.S. PATENT DOCUMENTS

| | | | |
|---|---|---|---|
| 3,820,471 | 6/1974 | Maki et al. | 104/282 |
| 3,890,906 | 6/1975 | Maki | 104/281 |
| 4,198,910 | 4/1980 | Gottzein et al. | 104/281 |
| 4,273,054 | 6/1981 | Yamashita et al. | 104/281 |
| 4,276,832 | 7/1981 | Sika et al. | 104/292 |
| 4,299,173 | 11/1981 | Arima et al. | 104/281 |

Primary Examiner—Mark T. Le
Attorney, Agent, or Firm—Scully, Scott, Murphy & Presser

[57] ABSTRACT

A magnetically levitated vehicle adapted for movement along a guideway, comprising a passenger compartment, at least first and second primary magnets and a plurality of confining magnets. The first and second primary magnets are secured on the vehicle to produce a magnetic field having a magnetic flux density extending outward from the primary magnets, to support the vehicle spaced from and to move the vehicle along the guideway. The plurality of confining magnets are disposed on the vehicle to confine the magnetic flux extending outward from the primary magnets and to reduce the strength of the primary magnetic field in the passenger compartment. Preferably, the confining magnets maintain the strength of the magnetic field in the passenger compartment below 5 gauss; and even more preferably, those magnets are used to maintain the strength of the primary magnetic field in the passenger compartment below 1 gauss. The confining magnets attenuate both the dc and ac fields in the passenger compartment, and also actually improve the concentration of magnetic flux available for levitation.

15 Claims, 2 Drawing Sheets

MAGNETIC FIELD CONFINEMENT FOR MAGNETICALLY LEVITATED VEHICLES

BACKGROUND OF THE INVENTION

This invention generally relates to magnetically levitated vehicles; and more specifically, to reducing the magnetic field strength in the passenger compartments of magnetically levitated vehicles.

In a magnetically levitated vehicle, a group of magnets located on the vehicle are used to hold the vehicle above a guideway. This is accomplished by propelling the magnets a few inches over the guideway, which is installed with aluminum coils or aluminum sheets along the full length of the guideway. The vehicle magnets induce magnetic fields in those aluminum coils or sheets; and these induced magnetic fields repel the vehicle magnets, causing the vehicle to levitate above the guideway. The higher the speed of the vehicle over the guideway, the greater the repulsive or levitation force between the vehicle magnets and the magnetic fields induced in the aluminum coils or sheets on the guideway.

Recently, attention has been directed to using superconducting magnets—that is, electromagnets in which an electric current is conducted through a superconducting material to produce a magnetic field—on magnetically levitated vehicles. Such magnets are capable of producing very strong steady state magnetic fields and alternating magnetic fields, referred to as dc and ac fields, respectively; and for example, magnetic field strengths of 10,000 to 20,000 gauss may be obtained with such magnets. When such magnetic fields are employed to levitate vehicles, however, the strengths of the magnetic fields in the passenger compartments of the vehicles may reach strengths, such as 100 to 200 gauss, that may be undesirably high. In particular, the magnetic fields in the passenger compartments may interfere with the operation of electrical equipment, and may have other undesirable effects.

Heretofore, two general procedures have been used to reduce or to minimize the strengths of the levitating magnetic fields in the passenger compartments of magnetically levitated vehicles. With a first of these procedures, passive devices such as soft iron or mu-metal sheets are used to shield the passenger compartments from the levitating magnetic fields. With the second of these procedures, active coils are used to null the effects of the levitating fields in the passenger compartments. The use of passive devices is generally undesirable because these devices are normally quite heavy and only shield the passenger compartments from the dc components of the magnetic fields. Active devices, which generally comprise superconducting coils, are significantly lighter than passive devices and can be arranged in a wide variety of sizes and geometries to null magnetic fields. However, active nulling coil devices also tend to reduce the effectiveness with which the levitating magnetic fields support the vehicles; and in order to null the ac fields associated with a levitating magnetic field, active devices must be wound in series with the main superconducting coils.

SUMMARY OF THE INVENTION

An object of this invention is to confine the flux lines of a superconducting magnet used on a magnetically levitated vehicle.

Another object of the present invention is to concentrate the magnetic flux lines of a superconducting magnet used on a magnetically levitated vehicle, within a restricted volume so as to minimize the amount of magnetic flux that enters the passenger cabin of the vehicle.

These and other objectives are attained with a magnetically levitated vehicle adapted for movement along a guideway, and comprising a passenger compartment, at least first and second primary magnets, and a plurality of confining magnets. The first and second primary magnets are secured on the vehicle to produce a magnetic field to hold the vehicle spaced from and to move the vehicle along the guideway; and the confining magnets are also secured on the vehicle to confine the magnetic flux extending outward from the primary magnets, and toward the passenger compartment, thereby to reduce the strength of the primary magnetic field in the passenger compartment of the vehicle.

Preferably, the confining magnets maintain the strength of the magnetic field in the passenger compartment below 5 gauss; and even more preferably, those magnets are used to maintain the strength of the primary magnetic field in the passenger compartment below 1 gauss. The confining magnets attenuate both the dc and ac fields in the passenger compartment, and also actually improve the concentration of magnetic flux available for levitation.

With one disclosed embodiment, the primary magnets are horizontally oriented beneath the passenger compartment, and the confining magnets are disposed between the passenger compartment and the primary magnets of the vehicle to confine the magnetic flux extending outward from those primary magnets. With another disclosed embodiment, the primary magnets are vertically oriented on laterally opposite sides of the vehicle, and the confining magnets are disposed between the primary magnets to confine the magnetic flux extending therefrom. In both disclosed embodiments, preferably the primary magnets and the confining magnets are superconducting magnets.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
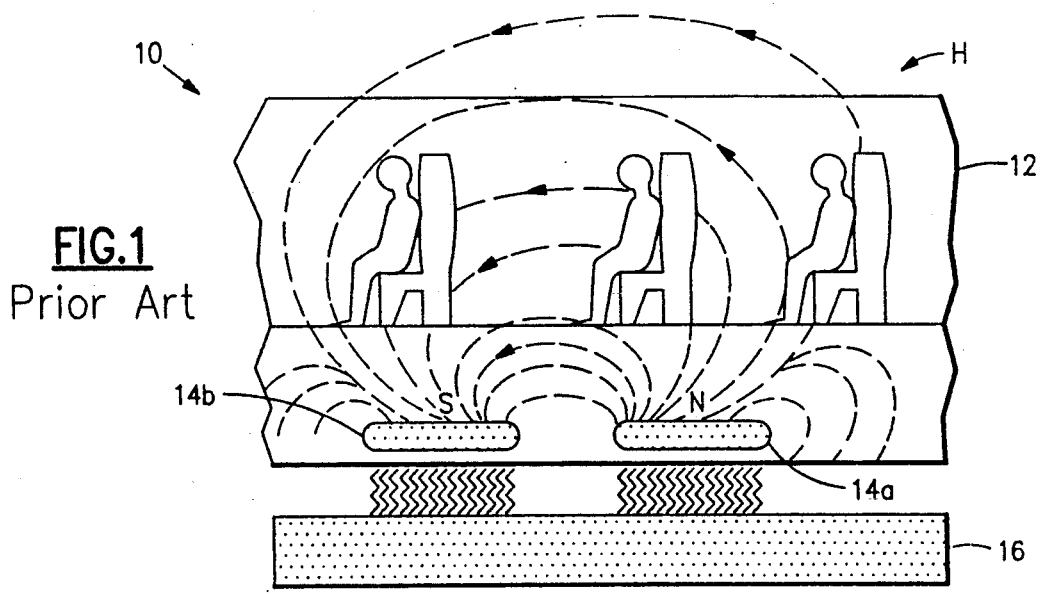
FIG. 1 shows a portion of a prior art magnetically levitated vehicle.

FIG. 1 illustrates a portion of a magnetically levitated vehicle 10 comprising a passenger compartment 12 and levitating magnets 14a and 14b that support the vehicle above and propel the vehicle along guideway 16, which includes or consists of aluminum coils or sheets. Magnetically levitated vehicles are well known, and it is not necessary to describe their specific construction and operation herein in detail. Briefly, though, each of the levitating magnets 14a and 14b is an electromagnet secured in or on the vehicle 10, and dc electric currents are conducted through each electromagnet so that each electromagnet becomes a magnetic dipole, having a north pole N, a south pole S, and a magnetic dipole moment. The currents through the two electromagnets 14a and 14b are controlled so that when the north pole of the magnetic dipole produced by the electromagnet 14a is at the top of that electromagnet, the south pole of the magnetic dipole produced by electromagnet 14b is at the top of that electromagnet; and, conversely, when the south pole of the magnetic dipole produced by electromagnet 14a is at the top of that electromagnet, the north pole of the magnetic dipole produced by electromagnet 14b is at the top of that electromagnet.

The magnetic dipole moments of the electromagnets 14a and 14b produce a magnetic field H, which propagates outward from the two electromagnets. At any point in space outside of the electromagnets 14a and 14b, the direction of the force of field H is always perpendicular to the direction of propagation of the field at that point. The dashed lines shown in FIG. 1 represent lines of magnetic force, or magnetic flux lines, and the direction of force of field H along these lines is shown by the arrows on those dashed lines.

As previously mentioned, attention has been recently given to using superconducting magnets to produce the magnetic fields used to levitate vehicles, because such magnets can produce very strong magnetic fields. One disadvantage of using very strong magnetic fields to support a vehicle, however, is that the magnetic field strength in the passenger compartment of the vehicle may reach undesirable levels.

Figure 2:
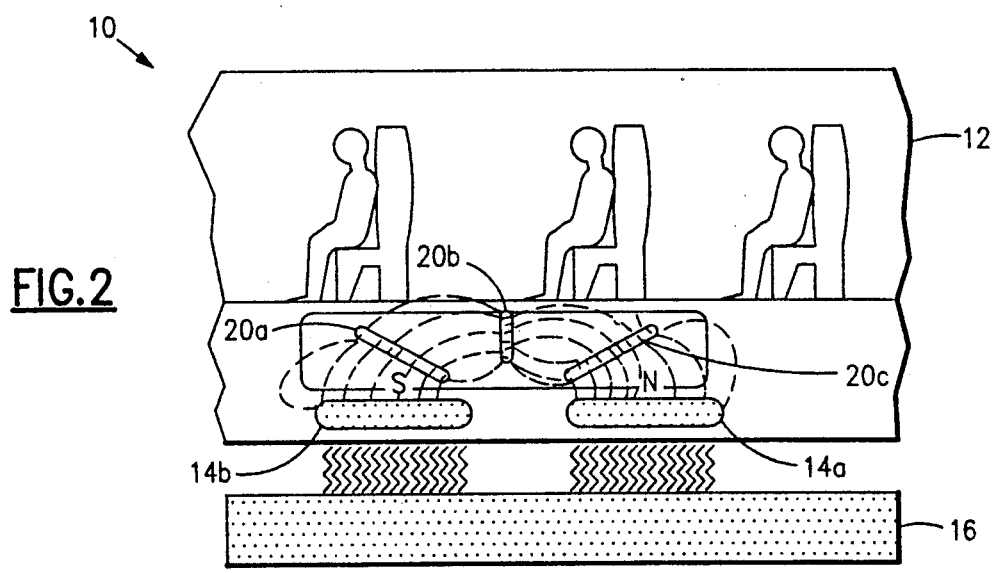
FIG. 2 shows the vehicle of FIG. 1 modified in accordance with the present invention.

With reference to FIG. 2, in accordance with the present invention, a plurality of confining magnets 20a, 20b, and 20c are positioned between passenger compartment 12 and levitating magnets 14a and 14b to confine the magnetic flux extending outward from the levitating magnets and toward the passenger compartment, to reduce the strength of the levitating magnetic field in that passenger compartment. Preferably, each of these confining magnets also is an electromagnet; and even more preferably, each of these confining magnets is also a superconducting magnet.

With the specific arrangement illustrated in FIG. 2, vehicle 10 is provided with three confining magnets, each of positioned substantially equidistant from both primary magnets 14a and 14b. Also, each of the magnets 20a and 20c is positioned at an angle of about 30° to the horizontal, extending upwardly outwardly from a point midway between the two primary magnets. Still further, magnet 20c is located generally above magnet 14a and is located about 60° from magnet 20b along an arc extending between magnets 20b and 14a; and magnet 20a is located above magnet 14b, about 60° from magnet 14b along an arc extending between magnets 20b and 14b.

It should be noted that different arrangements and different numbers of confining magnets may be used to confine the flux lines of magnetic field H in the desired manner. For instance, vehicle 10 may be provided with two confining magnets disposed above the primary magnets 14a and 14b and on an arc extending therebetween. Likewise, more than three confining magnets, also disposed above the primary magnets and on an arc extending therebetween, may be used to produce the desired confinement of the flux lines of magnetic field H.

Figure 3:
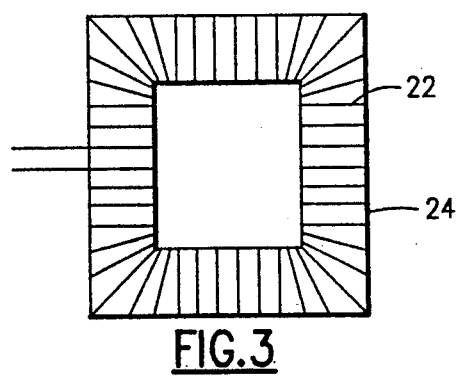
FIG. 3 is a plan view of one of the primary levitating electromagnets used on the vehicles of FIGS. 1 and 2.
Figure 4:
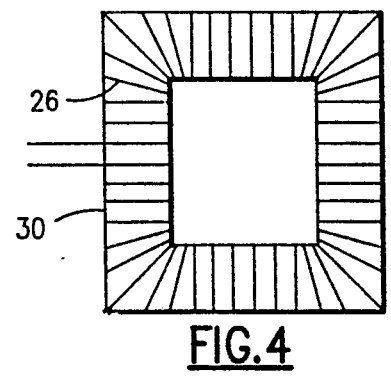
FIG. 4 is a plan view of one of the confining electromagnets used in the vehicle of FIG. 2.

Electromagnets 14a, 14b, 20a, 20b, and 20c may have any suitable shapes and sizes. For instance, with reference to FIGS. 3 and 4, each of magnets 14a and 14b may have a generally flat shape and comprise a coil 22 of an electrically conductive material wound around a rectangular shaped core member 24, and similarly, each of magnets 20a, 20b, and 20c may have a generally flat shape and comprise a coil 26 of an electrically conductive material wound around a rectangular shaped core member 30. Also, any suitable current source may be connected to electromagnets 14a, 14b, 20a, 20b, and 20c to generate the desired electric currents through those electromagnets.

In use, as electric currents are conducted through primary electromagnets 14a and 14b to produce the primary magnetic field H used to levitate and propel vehicle 10 along guideway 16, electric currents are also conducted through electromagnets 20a, 20b, and 20c to confine the flux lines of the primary magnetic field H, as outlined in FIG. 2, and thereby to reduce the strength of the magnetic field in passenger compartment 12. Preferably, magnets 20a, 20b, and 20c are used to maintain the strength of the magnetic field in the passenger compartment below 5 gauss; and even more preferably, those magnets are used to maintain the strength of the primary magnetic field in the passenger compartment below 1 gauss. It should be noted that the confining coils attenuate both the dc and ac fields in the passenger compartment, and also actually improve the concentration of magnetic flux available for levitation.

Figure 5:
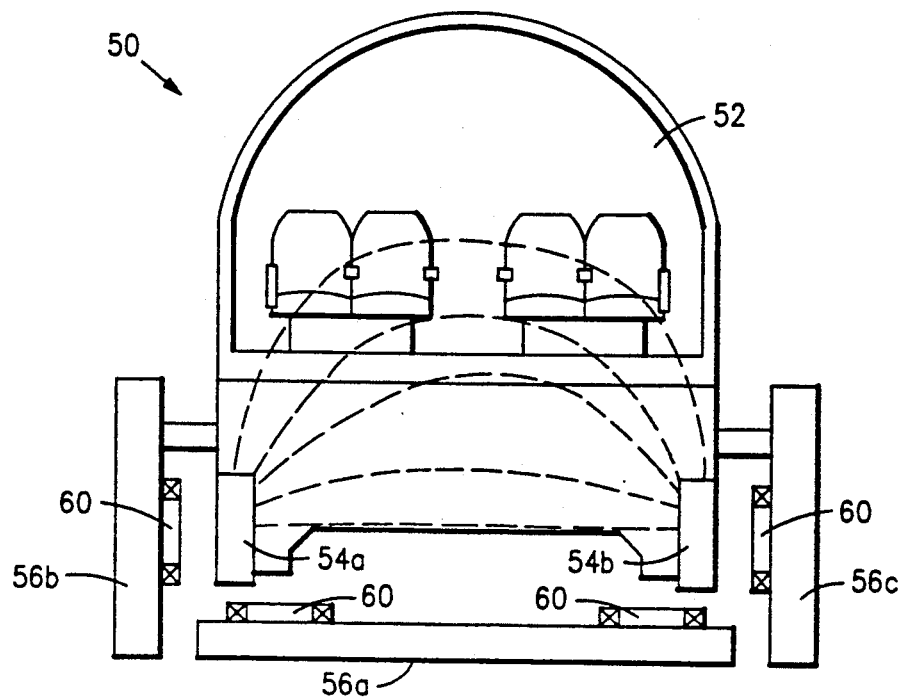
FIG. 5 shows a second prior art magnetically levitated vehicle.

In addition, the magnets may be oriented in a vertical direction, as opposed to the horizontal direction shown in FIG. 1. For instance, FIG. 5 shows a prior art magnetically levitated vehicle 50 comprising passenger compartment 52 and levitating electromagnets 54a and 54b. Electromagnets 54a and 54b, which preferably are superconducting magnets, are used to support vehicle 50 above and to move the vehicle over a central guideway 56a and between lateral guideways 56b and 56c, which are provided with aluminum coils 60. In use, electric currents are conducted through electromagnets 54a and 54b to propel vehicle 50 over guideway 56a. As a result of these currents, each of the electromagnets 54a and 54b becomes a magnetic dipole and the two electromagnets produces a magnetic field propagating outward from the electromagnets. The dashed lines in FIG. 5 represent lines of magnetic force, or magnetic flux lines, of this magnetic field.

Figure 6:
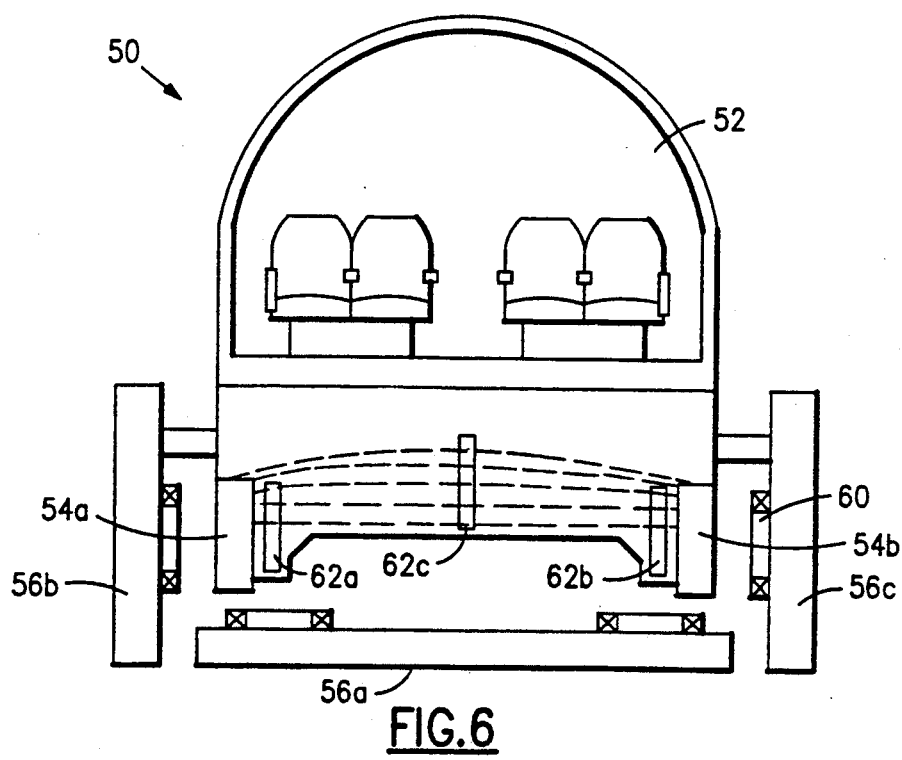
FIG. 6 shows the vehicle of FIG. 5 modified in accordance with the present invention.

With reference to FIG. 6, a plurality of confining magnets 62a, 62b and 62c are positioned between the levitating electromagnets 54a and 54b to confine the magnetic flux extending outward from the levitating magnets and toward the passenger compartment, to reduce the strength of the levitating magnetic field in that passenger compartment. Preferably, each of these confining magnets also is an electromagnet; and even more preferably, each of these confining magnets is also a superconducting magnet.

While it is apparent that the invention herein disclosed is well calculated t fulfill the objects previously stated, it will be appreciated that numerous modifications and embodiments may be devised by those skilled in the art, and it is intended that the appended claims cover all such modifications and embodiments as fall within the true spirit and scope of the present invention.

I claim:

1. A magnetically levitated vehicle adapted for movement along a guideway, comprising:
   a passenger compartment;
   first and second primary magnet means secured on the vehicle to produce a magnetic field having a magnetic flux density extending outward from the primary magnet means, to support the vehicle above and spaced from the guideway; and
   a plurality of confining magnets disposed on the vehicle to confine the magnetic flux extending outward from the primary magnet means and to reduce the strength of the primary magnetic field in the passenger compartment;
   wherein the primary magnet means has a capacity to produce a primary magnetic field having a maximum strength of at least 200 gauss in the passenger compartment, and the confining magnets maintain the strength of the primary magnetic field in the passenger compartment below 5 gauss.

2. A vehicle according to claim 1, wherein:
   the first and second primary magnet means are secured beneath the passenger compartment; and
   the confining magnets are disposed between the passenger compartment and the primary magnet means.

3. A vehicle according to claim 2, wherein each of the primary magnet means has a generally flat, horizontally oriented shape.

4. A vehicle according to claim 1, wherein:
   the first and second primary magnet means are secured on laterally opposite sides of the vehicle; and
   the confining magnets are disposed between the primary magnet means.

5. A vehicle according to claim 4, wherein each of the primary magnet means has a generally flat, vertically oriented shape.

6. A vehicle according to claim 1 wherein the confining magnets maintain the strength of the primary magnetic field in the passenger compartment below 1 gauss.

7. A vehicle according to claim 1, wherein the confining magnets include at least first and second confining magnets.

8. A vehicle according to claim 1, wherein the confining magnets include at least first, second, and third confining magnets.

9. A vehicle according to claim 8, wherein:
   each of the first and second primary magnet means is generally horizontal, and the first and second primary magnet means are horizontally spaced apart; and
   the second confining magnet is generally vertical and is positioned substantially equidistant from both of the first and second primary magnet means.

10. A method of reducing the magnetic field strength in a passenger compartment of a magnetically levitated vehicle of the type having at least a plurality of primary magnets to produce a magnetic field to hold the vehicle spaced from and to move the vehicle along a guideway, the method comprising:
    positioning a plurality of confining magnets on the vehicle; and
    conducting electrical currents through each of the confining magnets to confine the magnetic field extending outward from the primary magnets and toward the passenger compartment, to reduce the strength of the primary magnetic field in the passenger compartment, the conducting step including the step of maintaining the strength of the primary magnetic field in the passenger compartment below 5 gauss.

11. A method according to claim 10, wherein the maintaining step includes the step of maintaining the strength of the primary magnetic field in the passenger compartment below 1 gauss.

12. A method according to claim 10, wherein the positioning step includes the step of positioning at least two confining magnets between the primary magnets and the passenger compartment.

13. A method according to claim 10, wherein the positioning step includes the step of positioning at least three confining magnets between the primary magnets and the passenger compartment.

14. A method according to claim 10, wherein the positioning step includes the step of positioning the confining magnets laterally between the primary magnets.

15. A magnetically levitated vehicle adapted for movement along a guideway, comprising:
    a passenger compartment;
    first and second primary magnet means secured on the vehicle to produce a magnetic field having a magnetic flux density extending outward from the primary magnet means, to support the vehicle above the spaced from the guideway, wherein each of the first and second primary magnet means is generally horizontal, and the first primary magnet means is horizontally spaced apart from the second primary magnet means;
    a plurality of confining magnets disposed on the vehicle to confine the magnetic flux extending outward from the primary magnet means and to reduce the strength of the primary magnetic field in the passenger compartment, said plurality of confining magnets including
    (a) a first confining magnet located generally above the first primary magnet means and positioned in a plane extending generally at an angle of 30° to the horizontal,
    (ii) a second confining magnet positioned generally vertically and substantially equidistant from both of the first and second primary magnet means, and
    (iii) a third confining magnet located generally above the second primary magnet means and positioned in a plane extending generally at an angle of 30° to the horizontal.

* * * * *

UNITED STATES PATENT AND TRADEMARK OFFICE
CERTIFICATE OF CORRECTION

PATENT NO. : 5,213,046
DATED : May 25, 1993
INVENTOR(S) : Michael Proise

It is certified that error appears in the above-indentified patent and that said Letters Patent is hereby corrected as shown below:

Column 3, line 49: "of position" should read --of which has a generally flat shape. Magnet 20b is vertically positioned--

Column 4, line 62: "t" should read --to--

Column 6, line 37, Claim 15: "above the spaced" should read --above and spaced--

Column 6, line 48, Claim 15: "(a)" should read --(i)--

Signed and Sealed this

Nineteenth Day of April, 1994

BRUCE LEHMAN

Attest:

Attesting Officer

Commissioner of Patents and Trademarks